United States Patent
Zhong et al.

(10) Patent No.: US 9,212,075 B2
(45) Date of Patent: Dec. 15, 2015

(54) METHOD FOR RETREATING DEWATERED SLUDGE

(75) Inventors: Huansheng Zhong, Guangzhou (CN); Zhimin Sun, Guangzhou (CN); Jiacong Wu, Guangzhou (CN); Jiayu Chen, Guangzhou (CN)

(73) Assignee: Guangzhou New Extend Rising Environmental Protection Technologies Machinery Equipment Co., Ltd., Guangzhou (CN)

( * ) Notice: Subject to any disclaimer, the term of this patent is extended or adjusted under 35 U.S.C. 154(b) by 0 days.

(21) Appl. No.: 14/240,275

(22) PCT Filed: Aug. 20, 2012

(86) PCT No.: PCT/CN2012/001116
§ 371 (c)(1),
(2), (4) Date: Jun. 10, 2014

(87) PCT Pub. No.: WO2013/026263
PCT Pub. Date: Feb. 28, 2013

(65) Prior Publication Data
US 2014/0352377 A1  Dec. 4, 2014

(30) Foreign Application Priority Data

Aug. 22, 2011 (CN) .......................... 2011 1 0241296

(51) Int. Cl.
| C02F 11/14 | (2006.01) |
| C02F 11/12 | (2006.01) |
| C02F 11/18 | (2006.01) |
| C05D 3/02 | (2006.01) |
| C05F 7/00 | (2006.01) |

(52) U.S. Cl.
CPC ................. *C02F 11/12* (2013.01); *C02F 11/14* (2013.01); *C02F 11/18* (2013.01); *C05D 3/02* (2013.01); *C05F 7/00* (2013.01); *Y02W 30/43* (2015.05)

(58) Field of Classification Search
None
See application file for complete search history.

(56) References Cited

U.S. PATENT DOCUMENTS

| 3,942,970 | A | * | 3/1976 | O'Donnell | .......................... 71/12 |
| 4,306,978 | A | * | 12/1981 | Wurtz | .......................... 210/750 |
| 5,196,043 | A | * | 3/1993 | Wurtz | .............................. 71/12 |
| 6,413,433 | B1 | * | 7/2002 | Maury | ..................... C02F 11/14 |
| | | | | | 210/714 |
| 2006/0144799 | A1 | * | 7/2006 | Remy | ..................... C02F 11/14 |
| | | | | | 210/725 |
| 2010/0132421 | A1 | * | 6/2010 | Aho | .................................. 71/12 |
| 2010/0282672 | A1 | * | 11/2010 | Schillaci | ..................... 210/612 |
| 2011/0079060 | A1 | * | 4/2011 | Hackett et al. | ...................... 71/9 |
| 2011/0154873 | A1 | * | 6/2011 | Burnham et al. | ................... 71/8 |
| 2012/0247165 | A1 | * | 10/2012 | Zhong | ..................... C02F 11/14 |
| | | | | | 71/12 |
| 2013/0199255 | A1 | * | 8/2013 | Schulmann | ........................ 71/9 |

FOREIGN PATENT DOCUMENTS

| CN | 1101224912 | 7/2008 |
| CN | 201116292 | 9/2008 |
| CN | 101358153 | 2/2009 |
| CN | 101500952 | 8/2009 |
| CN | 101823825 | 9/2010 |
| CN | 201574114 | 9/2010 |
| CN | 101891362 | 11/2010 |
| CN | 102303944 | 1/2012 |
| GB | 2431924 | 5/2007 |
| JP | 3083880 A | 4/1994 |
| JP | 11300393 | 11/1999 |

OTHER PUBLICATIONS

Published Document: Characterization of sludges—Good practice for sludges drying, BSI Oct. 31, 2007.
Hu Long, et al., "Technology and Application Analysis of Thermal Drying Treatment for Municipal Sewage Sludge", 1999, available on web at http://d.g wanfangdata.com.cn/Periodical_sxhjyst199901019.aspx.

* cited by examiner

*Primary Examiner* — Wayne Langel
(74) *Attorney, Agent, or Firm* — Honigman Miller Schwartz and Cohn LLP

(57) ABSTRACT

The present invention discloses a method of retreating a viscous semi-solid dewatered sludge having a water content of 70-85%, which is characterized by comprising the steps of: (1) adding a desiccant into said dewatered sludge, and stirring the resulting mixture to produce a mixed sludge having a water content of 50-60%; and (2) drying the mixed sludge to produce a dried granular sludge, which has a water content of 45% or less. The method of retreating the sludge of the present invention can decrease the treatment energy consumption, have a simple dry waste gas treatment, greatly reduce the cost for treating the sludge, accomplish the clean production and the sludge's innocuity, stabilization, minimization, and recycle.

21 Claims, No Drawings

METHOD FOR RETREATING DEWATERED SLUDGE

CROSS-REFERENCE TO RELATED APPLICATIONS

This application claims priority from PCT application PCT/CN2012/001116, filed on Aug.20,2012, which claims priority from Chinese application 201110241296.2, filed on Aug.22,2011, the entire contents of which are incorporated by reference.

TECHNICAL FIELD

The present invention relates to a method of retreating a dewatered sludge obtained from wastewater treatment plant, in particular to a method of retreating a dewatered sludge having a water content of 70-85% from a wastewater treatment plant.

BACKGROUND ART

With the development of urbanization, the wastewater treatment rate is increasing. The sludge produced in the wastewater treatment is continuously increased, and therefore the treatment and disposal of the sludge becomes an intractable problem. In the wastewater treatment plant, a process of concentration, digestion and dewatering is usually used, the residual sludge produced in the wastewater treatment is treated in the plant to a dewatered sludge having a water content of 70-85%, and then the dewatered sludge is moved out of the plant for a further treatment or disposal. Since the dewatered sludge has a high water content and is in a high mass and volume and in a semi-solid state, it is not favorable for its loading and unloading, transport and storage. In addition, the dewatered sludge cannot be directly subjected to the treatment such as landfill, incineration, producing the building material and producing the fertilizer, and has to be further dewatered for the further disposal. Therefore, the further reduction of the water content of the dewatered sludge becomes an essential stage of the sludge disposal.

In the wastewater treatment plant, it is usually to add a polyacrylamide solution to the residual sludge or a concentrated sludge to conduct a flocculation conditioning, then the conditioned sludge is subjected to a solid-liquid separation with a centrifuge, a plate and frame filter press or a belt filter press to remove a part of water in the sludge to produce a dewatered sludge having a water content of 70-85%

In the above sludge dewatering process, the sludge particles are flocculated under the effect of the electrostatic neutralization and adsorption-bridge of the high molecular flocculant polyacrylamide to form larger sludge particles that enwrap a large quality of water. The enwrapped particles bond more firmly under the mechanical solid-liquid separation of the dewatering machine to form a strong sludge aggregation structure. This results in that the dewatered sludge having a water content of 70-85% is in a viscous semi-solid state, which brings great troubles to the subsequent further dewatering and drying.

The troubles are in the following aspects:

(1) In case of the further dewatering by conditioning, solid or liquid conditioning agents should be directly added to this semi-solid dewatered sludge. However, it is difficult to stir the resulting mixture homogenously. Therefore the conditioning effect will be adversely influenced;

(2) This dewatered sludge has a high viscosity and is apt to bond or block-up the device in the drying process, causing the device failure and increasing the risk of safety accident;

(3) This dewatered sludge is in a viscous state. Even if it is mechanically pre-dispersed, it will quickly bond together in the drying process, which reduces the sludges specific surface area, and influences the heat transfer efficiency for the heat-drying. It is easy to reduce the water content in the sludge's surface, but it is difficult to reduce the water content in the sludge's interior. If the water content of the whole sludge is to he reduced, the heat quantity for drying and the air quantity should be increased or the residual time of the sludge should be prolonged, which results in a higher energy consumption as well as an uneven drying (the exterior is dried while the interior is still wet, the so-called "soft yolk" phenomenon).

There are mainly two methods of retreating the dewatered sludge of this kind to farther decrease its water content: one is the heat drying method and the other is the lime stabilization method. For the heat drying method, water in the dewatered sludge is usually removed by the heat convection or the heat conduction so as to reduce the sludge's water content. The heat drying method can accomplish the sludge minimization by reducing the sludges water content. If a dewatered sludge having a water content of about 80% is dried to one having a water content of about 30%, the volume of the dewatered sludge can be reduced to 28% of its original volume, and therefore the mass and volume of the sludge to be subsequently disposed can be sharply decreased, and the cost for the subsequent sludge disposal can be remarkably reduced. However, it is difficult to disperse this viscous dewatered sludge, and therefore the dewatered sludge has a smaller specific surface area, the efficiencies of the mass transfer and the heat transfer upon drying are lower, and a large quantity of heat has to be consumed to evaporate water. Moreover, a large quantity of waste gas that is unmanageable will be produced in the drying process, and therefore the operation cost and the waste gas treatment cost are high. For the lime stabilization method, calcined lime is added to the dewatered sludge. The water content of the sludge is reduced by increasing the mass of the sludge on the dry basis, and the water content of the dewatered sludge is also decreased by evaporating a small amount of water in the sludge with the exothermal reaction of calcined lime. However, the lime stabilization will increase the mass of the treated sludge, rather than reducing the mass of the sludge. Therefore, the subsequent disposal cost will be increased. Moreover, the lime stabilization method produces a large quantity of ammonia, and therefore the cost for the waste gas management will increase.

The lime stabilization method is a conventional technology for treating sludge. JP 3083880A discloses a process of reusing sludge, in which calcined lime is used to remove water in sludge and dry the sludge. Specifically, the sludge and calcined lime are mixed and stirred in a stirrer having a specific structure to remove water in the sludge, and the produced heat is utilized to sterilize the sludge. The small dried sludge particles are processed into tine powder with a sludge powder-particle separator, and the resulting fine powder can be used as fertilizer or snow-melting agent.

The method disclosed in JP 3083880A utilizes the lime stabilization technology and represents the characteristic of the Hine stabilization. That is to say, a large amount of calcined lime is added. Because calcined time is used to react with water in the sludge to dry the sludge and the sludge has a higher water content, a large amount of calcined lime is added, resulting in a high operation cost. In the meanwhile, because a large quantity of lime is reacted with water in the sludge, the amount of the dry sludge is increased by comparison with that before the treatment, and usually increased by 50-100% of the dewatered sludge. This is opposite to the object of minimization for the retreatment of the dewatered sludge. In addition, JP 3083880A aims at a special sludge, river sludge, which has a more amount of mud and sands and a less amount of organic substances. Therefore, a less amount of ammonia will be produced in the reaction of the sludge and calcined lime. On the contrary, the dewatered sludge from a common wastewater treatment plant has a more amount of organic substances, and therefore a more amount of ammonia will be produced in the reaction of the sludge and calcined lime. This results in a bad operation environment and a safety risk. Moreover, the subsequent waste gas treatment is complex and costly.

CN101823825A discloses a process and an apparatus for dewatering and drying the sludge, wherein one or more of fly ash, fine manganese slag, calcined lime, ferric chloride; solution, and aluminum sulphate solution (preferably 50 kg of calcined lime and 2 kg of ferric chloride solution per one ton of the sludge) is added to a residual concentrated sludge; and the sludge is dewatered so that the water content of the sludge is below 60%; the dewatered sludge is sent to a pre-drying zone, a certain amount of calcined lime, potassium permanganate and a finished dry sludge is also sent to the pre-drying zone, and the resulting mixture is mixed homogenously; the pre-dried sludge is sent to a hollow paddle indirect drying machine; and the finished dried sludge is obtained after drying, wherein a part thereof is sent back to the pre-drying zone.

CN101823825A aims at the residual concentrated sludge having a high water content, usually 99-97%, which is in a liquid state and is not modified by adding polyacrylamide and therefore has no aggregation structure. From the viewpoint of the sludge's structure, it's easier for conditioning and dewatering. This patent application has no technical solution solving the problems such as the aggregation of the dewatered sludge caused by adding polyacrylamide which lead to a high energy consumption for drying, an uneven drying, and viscously bonding and blocking-up the device. This patent application is silent about dewatering the residual concentrated sludge having a water content of 99-97% to the level of 60%. This patent application teaches that at least two substances, an inorganic agent and the dried sludge are added to the dewatered sludge having a water content of below 60%, where the addition of a strong inorganic oxidant is for a better digestion. This patent application teaches that pile-turning is conducted for an aerobic digestion to reduce the organic substances in the sludge, which is advantageous for subsequently producing the budding material. It can be seen that the object of Conditioning the dewatered sludge and back-mixing the dried sludge is for a better digestion, rather than for decreasing the water content.

GB2431924A discloses a process and an apparatus for treating a liquid sewage sludge having a water content of 90% or more. A dry lime is added to a buffer zone and a high strength mixing zone of a contacting trough to increase the pH value of the liquid sewage sludge. The sludge and lime are recovered by a pump from the two zones. The treated sludge is they subjected to a dewatering process. The process and the apparatus in this patent application aim at a liquid sludge having a water content of 90% or more. The object is to improve the dewatering property of the liquid sludge before dewatering the sludge. This patent application is not suitable for the dewatered sludge having the water content of 70-85% and cannot accomplish the further dewatering of the dewatered sludge of this kind. Since the sludge having a water content of 70-85% is in a semi-solid state, it is substantially different from the liquid sludge. The apparatus of this patent application fails to accomplish mixing the dewatered sludge and lime homogenously. The addition of lime to the dewatered sludge is the so-called lime stabilization technology, the disadvantage of which has been discussed hereinbefore.

CN101224912A discloses a process for drying the sludge, which comprises: drying a dewatered sludge (having a water content of 69-51%) to the level of 10-1% as sludge drying support; conveying the sludge drying support and the dewatered sludge to be dried respectively to a stirring and mixing apparatus, stirring and mixing the resulting mixture therein to produce a mixed sludge (having a water content of 35-25%), using a part of the mixed sludge as starting material for producing the drying support and the other mixed sludge as the finished product, and conveying the mixed sludge which is used as starting material for producing the drying support to the drying apparatus to conduct the drying.

The method disclosed in CN101224912A aims at the dewatered sludge having a water content of 69-51%. For the dewatered sludge from the wastewater treatment plant having a higher water content (70-85%), the amount of the drying support to be back-mixed will be greatly increased, and therefore the corresponding load for the mixing and drying devices will be increased correspondingly. The method disclosed in CN101224912A is a technology in which the sludge is back-mixed. Although it can avoid the uneven drying of the sludge and can form good sludge particles, increase the sludge's specific surface area, improve the efficiencies of the mass transfer and the heat transfer, and has it lower operation energy consumption, it cannot overcome the problems that the dewatered sludge produces an aggregation structure and enwraps a large quantity of water caused by using polyacrylamide for conditioning in the wastewater treatment plant, and the semi-solid state of the dewatered sludge brings about the viscosity. Furthermore, the high speed mixing (where the linear speed is 100-527 m/min, and the angular speed is 55-280 r/min) in its stirring and mixing device cannot accomplish the pro-dispersion of the viscous sludge.

As set forth above, a large quantity of the dewatered sludge having a water content of about 70-85% obtained from the wastewater treatment plant is in demand of further reducing its water content for the subsequent treatment and disposal. The methods in the prior art have the following disadvantages: (1) The sludge to be treated is a sludge that is in a liquid state and is not modified with polyacrylamide, or a sludge having a lower water content, or a river sludge having a less amount of organic substances, and is different from the semi-solid dewatered Sludge having a water content of 70-85% that is obtained from the wastewater treatment plant and is dewatered after adding polyacrylamide. Therefore it is not applicable for the methods in the prior art. (2) The lime stabilization technology is generally used to treat the dewatered sludge. However, the addition of a large quantity of lime to the sludge does not conform to the principle of minimization, but increases the amount of the sludge to be subsequently transported, treated and disposed and increases the costs for the treatment and the disposal. Furthermore, a large amount of ammonia will be produced in the mixing, which increases the cost for treating the waste gas. (3) Adding the dried sludge, calcined lime, potassium permanganate and other agents to the sludge and then aerobically pile-turning the resulting mixture can reduce the water content and decrease the amount of the organic substances in the sludge. However, it is not in favor of the subsequent disposal of the sludge for producing the fertilizer. The disposal route is limited. The increase of the agents in kind and amount certainly increases the disposal cost. (4) In case of using the direct sludge drying technology to pass through the high viscosity phase of the sludge (wherein the water content is 60-45%), the energy consumption is high, and the soft yolk phenomenon (the exterior is dried while the interior is still wet) will appear; it is inevitable that the small molecular organic substances will be cracked in the drying; and the treatment of the produced waste gas is difficult and costly. (5) The sludge back-mixing and drying technology can only avoid the uneven drying of the sludge, but cannot destroy the aggregation structure of the sludge formed by the dewatering after the conditioning with polyacrylamide; it is difficult to effectively accomplish the pre-dispersion of the viscous sludge, resulting in that the energy consumption for the subsequent drying will increase correspondingly. Therefore, in order to overcome the above-mentioned problems, there is an urgent demand to develop a new method of retreating a dewatered sludge to treat this special dewatered sludge and accomplish its minimization, innocuity and recycle.

SUMMARY OF INVENTION

Aiming at the above mentioned deficiencies in the prior art, the present invention provides a method of retreating a dewatered sludge in order to accomplish the minimization, innocuity and recycle of the sludge, to reduce the treatment enemy consumption to simplify the waste gas treatment and to decrease the sludge treatment cost.

According to the present invention, the method of retreating a dewatered sludge comprises the steps of:

(1) adding a desiccant to the dewatered sludge having a water content of 70-85%, and stirring the resulting mixture to produce a mixed sludge having a water content of 50-60%;

(2) drying the mixed sludge to produce a dried granular sludge, which has a water content of 45% or less.

In an embodiment, said desiccant comprises an inorganic agent and the dried granular sludge. Said inorganic agent is selected from the group consisting of one or more inorganic agents having a hydratable setting capability, preferably selected from the group consisting of one or more of calcium oxide, calcium hydroxide, and calcium sulfate hemihydrate. The mass ratio of the addition amount of said desiccant to the amount of the dewatered sludge is 0.086-2.35, wherein the ratio of the mass of the dried granular sludge to the mass of the desiccant is 0.60-0,99, and the ratio of the mass of calcined lime to the mass of the desiccant is 0.05-0.35.

In another embodiment, the method of the present invention further comprises: mixing a part of the dried granular sludge obtained from the step (2) and said inorganic agent to produce the desiccant, which is recycled to the step (1), and conveying the other part of said dried granular sludge out of the system as the final product.

In further another embodiment, the method of the present invention further comprises: subjecting the part of the dried granular sludge obtained from the step (2) that is used for producing the desiccant to a second drying to a water content of 10-35%, and then using for producing the desiccant.

Said drying and said second drying, are conducted by heating the sludge with a hot air, wherein the temperature of the sludge after contacting with the hot air is 20-99° C.

In yet another embodiment, the method of the present invention further comprises: pile-turning and fermenting the finished product of the sludge to produce an organic fertilizer.

DESCRIPTION OF EMBODIMENTS

According to the present invention, the dewatered sludge to be retreated has a water content of 70-85%, preferably 70-80%. Furthermore, the dewatered sludge is a sludge which has been dewatered after adding polyacrylamide. Said dewatered sludge has a sludge aggregation structure, and is in a viscous semi-solid state. Therefore, neither the method for treating the liquid sludge having a water content of 90% or more nor the method for treating the liquid sludge having a water content of 60% or less can be used for retreating the sludge of this kind. Moreover, the sludge minimization and the reduction in the treatment energy consumption and cost should be taken into consideration.

The minimization is an important index for treating the sludge. The present invention provides a drying method for minimization of sludge. Firstly, a desiccant is added to the dewatered sludge before drying. The desiccant can destroy the aggregation structure in the dewatered sludge, reduce the viscosity of the sludge, release the hound water and the cell water so that the bound water and the cell water in the sludge are converted to free water, which is in favor of the subsequent drying. The desiccant includes an alkaline inorganic agent and a dried granular sludge. The inorganic agent (preferably calcined lime) and the dried granular sludge are mixed to form a desiccant having a smaller particle size, which increases the specific surface area for mixing with the dewatered sludge. When the desiccant and said dewatered sludge are stirred and mixed, the desiccant bonds onto the viscous dewatered sludge and form small sludge agglomerates, which gradually become the granular sludge in the subsequent mechanical stirring and drying with the hot air.

During the mixing, the following actions take place between the desiccant and the dewatered sludge: (1) the desiccant and polyacrylamide in the dewatered sludge are chemically reacted to destroy the adsorption bridge produced by polyacrylamide and thus the sludge aggregation structure in the dewatered sludge; and the desiccant and water enwrapped in the dewatered sludge are subjected to a water absorption exothermic reaction, so that water capillary-bound in the sludge particles are released, and therefore the viscosity of the sludge is reduced and the looseness of the sludge is increased. (2) The desiccant has an effect of destroying the cell wall and the cell membrane of the sludge, so that the cell water in the sludge is released, and that the cell water is converted to the free water under the stirring. The energy consumption for removing the free water in the sludge is much lower than that for removing the hound water, and is further lower than the energy consumption for removing the cell water. Therefore the energy consumption for the subsequent drying is remarkably reduced. (3) The desiccant disperses the viscous dewatered sludge. The desiccant bonds onto the dewatered sludge and form small sludge agglomerate particles, which expose the released capillary-bound water and the cell water onto the surface of the sludge particles under the mechanical stirring, which is in favor of the subsequent heat drying, making the drying more even and avoiding the soft yolk phenomenon.

From the viewpoint of the cost, the preferable inorganic agent is selected from the group consisting of one or more inorganic agents having a hydratable setting capability, preferably one or more of calcium oxide, calcium hydroxide, calcium sulfate hemihydrate, aluminate, phosphate, and sulfoaluminate. The most preferable inorganic agent is calcined lime.

The object of the present invention is also the reduction of the used amount of the inorganic agent in the desiccant to avoid the increment of the sludge. Therefore, the ratio of the mass of the added inorganic agent to the mass of the desiccant is 0.01-0.35%.

The alkaline inorganic agent is added in such an amount that said mixed sludge has a pH value of 7-10. If the value is above 11, a large quantity of ammonia will be produced. The above pH range according to the present invention is in favor of the waste gas treatment.

The dried granular sludge can be the finished product of the sludge obtained by the method of the present invention, or any dried granular sludge having a water content of 45% or less obtained by any other method. There is no particular limitation on the used amount of the dried granular sludge, provided that the obtained mixed sludge satisfies the relevant water content range. In general, the ratio of the used amount of the dried granular sludge to the mass of the desiccant is 0.6-0.99.

The desiccant is added to the dewatered sludge having the water content of 70-85%, and the resulting mixture is stirred and mixed to produce a mixed sludge having a water content of about 50-60%. On one hand, if the mixed sludge has a water content of above 60%, its viscosity is sill relatively large, and advantageous granular sludge cannot be formed. The drying device will still be bonded in the subsequent drying. The efficiency for the heat transfer is low. The energy consumption for drying is relatively high. On the other hand, if the mixed sludge has a water content of below 50%, it is necessary to add a large amount of the desiccant in the stirring and mixing, which results in that the production efficiency is decreased and the used amount of the inorganic agent is increased.

The mechanical stirring speed of the drying machine is controlled so that the mixed small sludge agglomerates are gradually granulated to particles. If the stirring speed is too high, the sludge granulation cannot be accomplished, and then the soft yolk phenomenon is still inevitable in the subsequent drying process, resulting in that the efficiency for the heat transfer is decreased and the energy consumption for drying is increased. If the stirring speed is too low, the efficiencies for drying and granulation will be decreased.

Then, the mixed sludge, which has been dispersed into particles, is dried. Preferably, the drying is conducted in a manner of an aerobic air-drying, in which a dry hot air is blew into the mixed sludge, which is stationary, moving or tumbled and has been dispersed into particles, causing the mixed sludge to experience an aerobic exothermic reaction. Under the combined action of the heat brought by the dry hot air and the heat produced by the aerobic exothermic reaction, water in the mixed sludge is evaporated to form said dried granular sludge, which has a water content of 45% or less. A part of the dried sludge particles is used as starting material for producing the desiccant, and the other part is conveyed out of the system as the finished product of the sludge.

Said dried granular sludge having a water content of 45% or less is subjected to a second drying, e.g. conducted in a manner of an aerobic air-drying, to reduce the water content to 10-35%, and then used as starting material for producing the desiccant.

Said two dryings are both conducted in a manner of the low-temperature drying. The temperature of the sludge that has been heated by the hot air is 20-99° C. The low-temperature drying can avoid the formation of dioxin that is produced during the high-temperature drying, and prevent the dust explosion caused by the high-temperature drying. In addition, the energy consumption for drying can be decreased.

For the second drying, it is preferable that the granular sludge is dried to the water content of 10-35%. It is found by the inventors that if the water content range is above 35%, provided that the same amount of the dried sludge particles is added and the mixed sludge can have a water content of 50-60%, the possible addition amount of the dewatered sludge is relatively low, and the output of the finished product of the sludge is also reduced. If the water content is below 10%, said dried granular sludge can form dust, which is apt to cause the risk of the dust explosion.

The above drying process can be conducted in an existing Sludge air-drying apparatus. CN201574114U, owned by the present inventors, discloses a sludge air-drying apparatus, and is incorporated herein as reference.

The finished product of the sludge maintains the organic substances in the dewatered sludge, which can be mixed with the biomass such as dry branches and fallen leaves and straws with an optional addition of nutrient substances containing nitrogen, phosphorus and/or potassium, and be pile-turned and fermented to produce the organic fertilizer, for example, for the landscaping. It can be understood that the use of the finished product of the sludge is not limited thereto, and may include a combustion adjuvant, a soil amendment and the like. Thus, the recycle of the sludge can be accomplished.

In comparison with the prior art, the method of retreating the dewatered sludge, as provided by the present invention, has the following advantages:

(1) The energy consumption is low and the waste gas is easy to treat. The addition of the desiccant combination with using an air-drying apparatus to air-dry the sludge results in that the treatment method has a low energy consumption. The energy consumption for removing the water in the sludge with said method is about 250-500 k Wh/t water. In comparison with the conventional drying methods, the energy consumption is reduced by about ½. According to the British Standard: Characterization of sludges. Good practice for sludges drying, (PD-CENTR-15473-2007), the energy consumptions of various drying machines are as follows: the tray drying machine: 855-955 kWh/t water; the blade drying machine: 800-885 k Wh/t water; the film drying machine: 800-900 kWh it water; the belt drying machine: 950-1140 k Wh/t water; the direct drum drying machine: 900-1100 k Wh/t water.

The reason why the present treatment method has a low energy consumption lies in using. the desiccant to convert the bound water and the cell water in the dewatered sludge to the free water, and dispersing the viscous dewatered sludge before the drying, which increases the sludge's specific surface area, is in favor of the mass transfer and the heat transfer in the subsequent drying, improves the efficiency for the heat transfer, and increases the efficiency for the drying; the dry waste gas is ammonia, which can be emitted after being treated with a simple process, resulting in the reduction of the cost for the waste gas treatment.

(2) The sludge minimization is accomplished. According to the method of the present invention, the addition amount of the desiccant is relatively small and the amount of the introduced inorganic agent is small, the increment of the treated sludge is not remarkable; in contrast, as to the lime stabilization technology, the addition amount of lime is generally 50-100% of the total amount of the sludge, which greatly increases the amount of the treated sludge, and thus increases the cost for the subsequent sludge treatment and disposal. According to the present invention, the dried sludge particles are recycled and used as starting material for producing the desiccant, which reduces the kind and the amount of the additional substances added to the system. Furthermore, the water content of the finished product of the sludge is significantly reduced, and therefore the sludge minimization is accomplished.

(3) The sludge innocuity and stabilization treatment is accomplished. The component of calcium oxide in the desiccant can kill the bacteria and pathogen in the sludge, and inactivate the heavy metals in the sludge so that the heavy metal index, for the leach liquor of the sludge conforms to the relevant national standards. Therefore the sludge harmlessness and stabilization is accomplished, which is in favor of the subsequent treatment and disposal.

(4) The low-temperature drying is used. The temperature of the sludge that has been heated by the hot air is 20-99° C. The low-temperature drying can avoid the formation of dioxin that is produced during the high-temperature drying, and prevent the dust explosion caused by the high-temperature drying in addition, the energy consumption for drying can be decreased.

(5) The method of the present invention maintains the organic substances in the sludge. When the finished product of the sludge is further used as fertilizer, the fertilizer efficiency is greatly increased, and therefore the reuse value of the sludge is enhanced.

EXAMPLE 1

A dewatered sludge, which had been subjected to the conditioning by adding polyacrylamide and dewatering and had a water content of 82%, was retreated in the sludge air-drying apparatus as disclosed in CN201574114U.

Calcined lime and the granular sludge having a water content 33% were stirred, mixed and reacted to produce a desiccant, wherein the mass of calcined lime comprised 4.47% of the mass of the desiccant, and the mass of the dried granular sludge comprised 95.53% of the mass of the desiccant.

Then the dewatered sludge and the desiccant were uniformly added at a constant speed to the beginning end of the first air-drying stage of the sludge air-drying apparatus, wherein the ratio of the addition amount (by mass) of the desiccant to the mass of the dewatered sludge was 91.7%; after thoroughly and homogenously mixing, a mixed sludge having a water content of 58% was obtained.

A pair of roller reamer bits in the first air-drying stage was adjusted to a linear speed of 1-6 m/min and an angular speed of 0-20 r/min. The mixed sludge was further stirred under the mechanical stirring action to become a loose granular sludge. A hot air was blew into the first air-drying stage. The temperature of the sludge after contacting with the hot air was 70° C. The water in the sludge was taken away under the heat transfer and the mass transfer action of the hot air. The dried loose granular sludge was obtained at the tail end of the first air-drying stage of the sludge air-drying apparatus. The dried loose granular sludge was sampled and tested to find that its water content was 43%. The sludge that had been subjected to the first drying was divided into two parts. One part was sent to the second air-drying stage of the sludge air-drying apparatus for the second drying, and the other part was conveyed out of the system as the finished product of the sludge.

The second air-drying stage was operated in the same drying principle as the first air-drying stage. A pair of roller reamer cutters had a linear speed of 1-6 m/min and an angular speed of 0-20 r/min. The first-dried sludge was further stirred under the mechanical stirring action to become a small granular sludge. A hot air was blew into the second air-drying stage. The temperature of the sludge after contacting with the hot air was 68° C. The water in the sludge was taken away under the heat transfer and the mass transfer action of the hot air. The water content of the sludge was further decreased. The dried granular sludge was sampled at the tail end of the second air-drying stage and tested to find that its water content was 33%.

The dried granular sludge from the second air-drying stage and calcined lime were stirred, mixed and reacted to produce the desiccant. The dewatered sludge and the desiccant were uniformly added at a constant speed to the beginning end of the first air-drying stage, and this operation was continuously recycled.

EXAMPLE 2

A dewatered sludge, which had been subjected to the conditioning by adding polyacrylamide and dewatering and had a water content of 77%, was retreated in the sludge air-drying apparatus as disclosed in CN2015741114U.

Calcined lime and the granular sludge having a water content 28% were stirred, mixed and reacted to produce a desiccant, wherein the mass of calcined lime comprised 1.21% of the mass of the desiccant, and the mass of the dried granular sludge comprised 98.79% of the mass of the desiccant.

Then the dewatered sludge and the desiccant were uniformly added at a constant speed to the beginning end of the first air-drying stage of the sludge air-drying apparatus, wherein the ratio of the addition amount (by mass) of the desiccant to the mass of the dewatered sludge was 91.1%; after thoroughly and homogenously mixing, a mixed sludge having a water content of 53% was obtained.

A pair of roller reamer bits in the first air-drying stage was adjusted to a linear speed of 1-6 m/min and an angular speed of 0-20 r/min. The mixed sludge was further stirred under the mechanical stirring action to become a loose granular sludge. A hot air was blew into the first air-drying stage. The temperature of the sludge after contacting with the hot air was 66° C. The water in the sludge was taken away under the heat transfer and the mass transfer action of the hot air. The dried loose granular sludge was obtained at the tail end of the first air-drying stage of the sludge air-drying apparatus. The dried loose granular sludge was sampled and tested to find that its water content was 39%. The sludge that had been subjected to the first drying was divided into two parts. One part was sent to the second air-drying stage of the sludge air-drying apparatus for the second drying, and the other part was conveyed out of the system as the finished product of the sludge.

The second air-drying stage was operated in the same drying principle as the first air-drying stage. A pair of roller reamer cutters had a linear speed of 1-6 m/min and an angular speed of 0-20 r/min. The first-dried sludge was further stirred under the mechanical stirring action to become a small granular sludge. A hot air was blew into the second air-drying stage. The temperature of the sludge after contacting with the hot air was 63° C. The water in the sludge was taken away under the heat transfer and the mass transfer action of the hot air. The water content of the sludge was further decreased. The dried granular sludge was sampled at the tail end of the second air-drying stage and tested to find that its water content was 28%.

The dried granular sludge from the second air-drying stage and calcined lime were stirred, mixed and reacted to produce the desiccant. The dewatered sludge and the desiccant were uniformly added at a constant speed to the beginning end of the first air-drying stage, and this operation was continuously recycled.

EXAMPLE 3

A dewatered sludge, which had been subjected to the conditioning by adding polyacrylamide and dewatering and had a water content of 71%, was retreated in the sludge air-drying apparatus as disclosed in CN201574114U.

Calcined lime and the granular sludge having a water content 21% were stirred, mixed and reacted to produce a desiccant, wherein the mass of calcined lime comprised 5.21% of the mass of the desiccant, and the mass of the dried granular sludge comprised 94.79% of the mass of the desiccant.

Then the dewatered sludge and the desiccant were uniformly added at a constant speed to the beginning end of the first air-drying stage of the sludge air-drying apparatus, wherein the ratio of the addition amount (by mass) of the desiccant to the mass of the dewatered sludge was 61.19%; after thoroughly and homogenously mixing, a mixed sludge having a water content of 50% was obtained.

A pair of roller reamer bits in the first air-drying stage was adjusted to a linear speed of 1-6 m/min and an angular speed of 0-20 r/min. The mixed sludge was farther stirred under the mechanical stirring action to become a loose granular sludge. A hot air as blew into the first air-drying stage. The temperature of the sludge after contacting with the hot air was 62° C. The water in the sludge was taken away under the heat transfer and the mass transfer action of the hot air. The dried loose granular sludge was obtained at the tail end of the first air-drying stage of the sludge air-drying apparatus. The dried loose granular sludge was sampled and tested to find that its water content was 34%. The sludge that had been subjected to the first drying was divided into two parts. One part was sent to the second air-drying stage of the sludge air-drying apparatus for the second drying, and the other part was conveyed out of the system as the finished product of the sludge.

The second air-drying stage was operated in the same drying principle as the first air-drying Stage. A pair of roller reamer cutters had a linear speed of 1-6 m/min and an angular speed of 0-20 r/min. The first-dried sludge was further stirred under the mechanical stirring action to become a small granular sludge. A hot air was blew into the second air-drying stage. The temperature of the sludge after contacting with the hot air was 59° C. The water in the sludge was taken away under the heat transfer and the mass transfer action of the hot air. The water content of the sludge was further decreased. The dried granular sludge was sampled at the tail end of the second air-drying stage and tested to find that its water content was 21%.

The dried granular sludge from the second air drying stage and calcined lime were stirred, mixed and reacted to produce the desiccant. The dewatered sludge and the desiccant were uniformly added at a constant speed to the beginning end of the first air-drying, stage, and this operation was continuously recycled.

The invention claimed is:

1. A method of retreating a dewatered sludge comprising the steps of:
   (1) adding a desiccant into said dewatered sludge, and stirring the resulting mixture to produce a mixed sludge having a water content of 50-60%; and
   (2) drying the mixed sludge to produce a dried granular sludge, which has a water content of 45% or less,
   wherein the dewatered sludge has a water content of 70-85%, the dewatered sludge is in a viscous semi-solid state, and the dewatered sludge comprises polyacrylamide.

2. The method of retreating a dewatered sludge according to claim 1, wherein said desiccant comprises an inorganic agent and the dried granular sludge.

3. The method of retreating the dewatered sludge according to claim 2, wherein said inorganic agent is selected from the group consisting of inorganic agents having a hydratable setting capability.

4. The method of retreating the dewatered sludge according to claim 3, wherein said inorganic agent is selected from the group consisting of calcium oxide, calcium hydroxide, calcium sulfate hemihydrate, aluminate, phosphate, and sulfoaluminate.

5. The method of retreating the dewatered sludge according to claim 3, wherein the mass ratio of the addition amount of said desiccant to the amount of the dewatered sludge is 0.086-2.35, wherein the ratio of the mass of the dried granular sludge to the mass of the desiccant is 0.60-0.99, and the ratio of the mass of the inorganic agent to the mass of the desiccant is 0.01-0.35.

6. The method of retreating the dewatered sludge according to claim 2, wherein a part of the dried granular sludge obtained from the step (2) and said inorganic agent are mixed to produce the desiccant, which is recycled to the step (1), and the other part of said dried granular sludge is conveyed out of the system as the final product.

7. The method of retreating the dewatered sludge according to claim 6, further comprising the step of: subjecting the part of the dried granular sludge obtained from the step (2) that is used for producing the desiccant to a second drying to a water content of 10-35%, and then using for producing the desiccant.

8. The method of retreating the dewatered sludge according to claim 1, wherein all dryings are conducted by heating the sludge with a hot air, and wherein the temperature of the sludge after contacting with the hot air is 20-99° C.

9. The method of retreating the dewatered sludge according to claim 2, wherein all dryings are conducted by heating the sludge with a hot air, and wherein the temperature of the sludge after contacting with the hot air is 20-99° C.

10. The method of retreating the dewatered sludge according to claim 3, wherein all dryings are conducted by heating the sludge with a hot air, and wherein the temperature of the sludge after contacting with the hot air is 20-99° C.

11. The method of retreating the dewatered sludge according to claim 4, wherein all dryings are conducted by heating the sludge with a hot air, and wherein the temperature of the sludge after contacting with the hot air is 20-99° C.

12. The method of retreating the dewatered sludge according to claim 5, wherein all dryings are conducted by heating the sludge with a hot air, and wherein the temperature of the sludge after contacting with the hot air is 20-99° C.

13. The method of retreating the dewatered sludge according to claim 6, wherein all dryings are conducted by heating the sludge with a hot air, and wherein the temperature of the sludge after contacting with the hot air is 20-99° C.

14. The method of retreating the dewatered sludge according to claim 7, wherein all dryings are conducted by heating the sludge with a hot air, and wherein the temperature of the sludge after contacting with the hot air is 20-99° C.

15. The method of retreating the dewatered sludge according to claim 1, further comprising the step of: pile-turning and fermenting the finished product of the sludge to produce an organic fertilizer.

16. The method of retreating the dewatered sludge according to claim 2, further comprising the step of: pile-turning and fermenting the finished product of the sludge to produce an organic fertilizer.

17. The method of retreating the dewatered sludge according to claim 3, further comprising the step of: pile-turning and fermenting the finished product of the sludge to produce an organic fertilizer.

18. The method of retreating the dewatered sludge according to claim 4, further comprising the step of: pile-turning and fermenting the finished product of the sludge to produce an organic fertilizer.

19. The method of retreating the dewatered sludge according to claim 5, further comprising the step of: pile-turning and fermenting the finished product of the sludge to produce an organic fertilizer.

20. The method of retreating the dewatered sludge according to claim 6, further comprising the step of: pile-turning and fermenting the finished product of the sludge to produce an organic fertilizer.

21. The method of retreating the dewatered sludge according to claim 7, further comprising the step of: pile-turning and fermenting the finished product of the sludge to produce an organic fertilizer.

* * * * *